(12) United States Patent
White

(10) Patent No.: US 10,587,926 B2
(45) Date of Patent: Mar. 10, 2020

(54) SYSTEM AND METHOD FOR PROMOTING MARKETABLE ITEMS

(71) Applicant: AT&T INTELLECTUAL PROPERTY I, L.P., Atlanta, GA (US)

(72) Inventor: Scott White, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/612,556

(22) Filed: Jun. 2, 2017

(65) Prior Publication Data
US 2017/0272823 A1 Sep. 21, 2017

Related U.S. Application Data

(63) Continuation of application No. 14/679,063, filed on Apr. 6, 2015, now Pat. No. 9,706,258, which is a
(Continued)

(51) Int. Cl.
*H04N 21/478* (2011.01)
*G06Q 30/02* (2012.01)
(Continued)

(52) U.S. Cl.
CPC ....... *H04N 21/47815* (2013.01); *G06Q 30/02* (2013.01); *H04L 65/1059* (2013.01);
(Continued)

(58) Field of Classification Search
CPC ........... H04N 21/47815; H04N 21/858; H04N 21/6405; H04N 21/6408; H04N 21/64322;
(Continued)

(56) References Cited

U.S. PATENT DOCUMENTS 5,794,210 A    8/1998 Goldhaber et al.
6,282,713 B1   8/2001 Kitsukawa
(Continued)

FOREIGN PATENT DOCUMENTS

KR    20030037130    5/2003
WO    200079453     12/2000

OTHER PUBLICATIONS

"Ebay", www.ebay.com; Jun. 28, 2011.
(Continued)

*Primary Examiner* — Yassin Alata
(74) *Attorney, Agent, or Firm* — Guntin & Gust, PLC; Mark Wilinski

(57) ABSTRACT

A system that incorporates teachings of the present disclosure may include, for example, a media processor having a controller to receive from a media communication system metadata describing one or more marketable items depicted in a media program supplied by the media communication system, present images of the media program at a media presentation device without highlighting the one or more marketable items, present an icon at least at one of a remote controller managing operations of the media processor or the media presentation device to indicate a presence of the one or more marketable items in one or more of the images presented at the media presentation device, detect a selection of the icon, and highlight the one or more marketable items. Other embodiments are disclosed.

20 Claims, 12 Drawing Sheets

1400

Related U.S. Application Data continuation of application No. 14/529,379, filed on Oct. 31, 2014, now Pat. No. 9,027,061, which is a continuation of application No. 14/260,336, filed on Apr. 24, 2014, now Pat. No. 8,904,448, which is a continuation of application No. 12/037,756, filed on Feb. 26, 2008, now Pat. No. 8,745,670.

(51) Int. Cl.

| | |
|---|---|
| *H04N 21/443* | (2011.01) |
| *H04N 21/6405* | (2011.01) |
| *H04N 21/6408* | (2011.01) |
| *H04N 21/643* | (2011.01) |
| *H04N 21/81* | (2011.01) |
| *H04L 29/06* | (2006.01) |
| *H04N 21/422* | (2011.01) |
| *H04N 21/472* | (2011.01) |
| *H04N 21/4722* | (2011.01) |
| *H04N 21/61* | (2011.01) |
| *H04N 21/8545* | (2011.01) |
| *H04N 21/858* | (2011.01) |

(52) U.S. Cl.
CPC . *H04N 21/42208* (2013.01); *H04N 21/42209* (2013.01); *H04N 21/443* (2013.01); *H04N 21/4722* (2013.01); *H04N 21/47217* (2013.01); *H04N 21/6125* (2013.01); *H04N 21/6405* (2013.01); *H04N 21/6408* (2013.01); *H04N 21/64322* (2013.01); *H04N 21/812* (2013.01); *H04N 21/8133* (2013.01); *H04N 21/8166* (2013.01); *H04N 21/858* (2013.01); *H04N 21/8545* (2013.01); *H04L 65/4092* (2013.01); *H04L 65/607* (2013.01)

(58) Field of Classification Search
CPC .......... H04N 21/8166; H04N 21/6125; H04N 21/4722; H04N 21/47217; H04N 21/42209; H04N 21/42208; H04N 21/812; H04N 21/8133; H04N 21/8545; H04N 21/443

See application file for complete search history.

(56) References Cited

U.S. PATENT DOCUMENTS

| | | | |
|---|---|---|---|
| 6,968,006 | B1 | 11/2005 | Puri et al. |
| 7,000,242 | B1 | 2/2006 | Haber |
| 7,149,710 | B1 | 12/2006 | Edmark |
| 7,269,643 | B2 | 9/2007 | Spaid |
| 7,293,280 | B1* | 11/2007 | Gupta ................. G06F 17/241 |
| | | | 348/E7.071 |
| 7,444,659 | B2 | 10/2008 | Lemmons |
| 7,925,743 | B2 | 4/2011 | Neely |
| 8,010,986 | B2 | 8/2011 | Bove, Jr. et al. |
| 8,386,317 | B2 | 2/2013 | Brown et al. |
| 8,424,052 | B2 | 4/2013 | Abed |
| 8,635,674 | B2 | 1/2014 | Bhatia et al. |
| 8,762,850 | B2 | 6/2014 | Matz et al. |
| 8,910,201 | B1 | 12/2014 | Zamiska et al. |
| 9,113,040 | B2 | 8/2015 | Beyabani et al. |
| 9,143,565 | B2 | 9/2015 | Hensgen et al. |
| 2002/0083469 | A1 | 6/2002 | Jeannin |
| 2002/0162120 | A1* | 10/2002 | Mitchell ................. H04N 7/165 |
| | | | 725/135 |
| 2003/0020744 | A1* | 1/2003 | Ellis ....................... H04H 60/31 |
| | | | 715/723 |
| 2003/0028873 | A1* | 2/2003 | Lemmons .......... H04N 7/17318 |
| | | | 725/36 |
| 2003/0033192 | A1 | 2/2003 | Zyman |
| 2004/0019524 | A1* | 1/2004 | Marshall ............ G06Q 30/0242 |
| | | | 705/26.1 |
| 2004/0116183 | A1 | 6/2004 | Prindle |
| 2004/0167814 | A1 | 8/2004 | Hawks |
| 2004/0249700 | A1 | 12/2004 | Gross et al. |
| 2005/0021398 | A1 | 1/2005 | McCleskey et al. |
| 2005/0229227 | A1* | 10/2005 | Rogers ................... G06Q 30/02 |
| | | | 725/115 |
| 2006/0089843 | A1 | 4/2006 | Flather |
| 2006/0090131 | A1 | 4/2006 | Kumagai et al. |
| 2006/0230123 | A1 | 10/2006 | Simmons |
| 2006/0282319 | A1 | 12/2006 | Maggio |
| 2006/0288374 | A1 | 12/2006 | Ferris et al. |
| 2007/0089157 | A1 | 4/2007 | Clark |
| 2007/0107021 | A1 | 5/2007 | Angel |
| 2007/0198510 | A1 | 8/2007 | Ebanks |
| 2007/0276726 | A1 | 11/2007 | DiMatteo |
| 2008/0002892 | A1 | 1/2008 | Jelonek et al. |
| 2008/0015933 | A1 | 1/2008 | McKenna et al. |
| 2008/0071594 | A1 | 3/2008 | Morin |
| 2008/0098425 | A1 | 4/2008 | Welch |
| 2008/0167943 | A1 | 7/2008 | O'Neil et al. |
| 2008/0246759 | A1 | 10/2008 | Summers |
| 2008/0255961 | A1* | 10/2008 | Livesey ................. G06Q 30/02 |
| | | | 705/26.8 |
| 2008/0306830 | A1 | 12/2008 | Lasa |
| 2008/0310731 | A1 | 12/2008 | Stojancic et al. |
| 2009/0019474 | A1 | 1/2009 | Robotham et al. |
| 2009/0063991 | A1 | 3/2009 | Baron et al. |
| 2009/0064219 | A1* | 3/2009 | Minor ................... G06Q 30/02 |
| | | | 725/32 |
| 2009/0089830 | A1 | 4/2009 | Chandratillake et al. |
| 2009/0119165 | A1 | 5/2009 | Cotgreave et al. |
| 2009/0132342 | A1 | 5/2009 | Klinger et al. |
| 2009/0167870 | A1 | 7/2009 | Caleca |
| 2010/0058381 | A1 | 3/2010 | Begeja et al. |
| 2010/0076851 | A1 | 3/2010 | Jewell |
| 2010/0122286 | A1 | 5/2010 | Begeja et al. |
| 2010/0131385 | A1 | 5/2010 | Harrang |
| 2010/0138478 | A1 | 6/2010 | Meng |
| 2010/0162288 | A1 | 6/2010 | Huffman |
| 2010/0179874 | A1 | 7/2010 | Higgins et al. |
| 2010/0228631 | A1 | 9/2010 | Zhang |
| 2010/0299360 | A1 | 11/2010 | Yi et al. |
| 2011/0093336 | A1 | 4/2011 | Calabria |
| 2011/0106618 | A1 | 5/2011 | Ben-Moshe |
| 2011/0142417 | A1 | 6/2011 | Wilson et al. |
| 2011/0251898 | A1 | 10/2011 | Scott et al. |
| 2011/0264523 | A1 | 10/2011 | Scott et al. |
| 2011/0264528 | A1 | 10/2011 | Whale |
| 2011/0270685 | A1 | 11/2011 | Marks et al. |
| 2011/0307481 | A1 | 12/2011 | Leite et al. |
| 2011/0321083 | A1 | 12/2011 | Rouse et al. |
| 2012/0011550 | A1 | 1/2012 | Holland et al. |
| 2012/0022947 | A1 | 1/2012 | Esprey |
| 2012/0054791 | A1 | 3/2012 | Millar et al. |
| 2012/0150631 | A1 | 6/2012 | Root et al. |
| 2012/0158476 | A1 | 6/2012 | Neystadt et al. |
| 2012/0216226 | A1 | 8/2012 | Humphrey et al. |
| 2012/0232956 | A1 | 9/2012 | Dilip et al. |
| 2012/0266197 | A1 | 10/2012 | Andrews, II et al. |
| 2012/0297417 | A1 | 11/2012 | Philpott et al. |
| 2012/0311649 | A1 | 12/2012 | Patten et al. |
| 2013/0019261 | A1 | 1/2013 | Huber et al. |
| 2013/0297623 | A1 | 11/2013 | Niyogi et al. |
| 2014/0013350 | A1 | 1/2014 | Pan et al. |
| 2015/0206348 | A1 | 7/2015 | Koreeda |
| 2016/0301986 | A1 | 10/2016 | Bonvolanta |
| 2017/0272823 | A1 | 9/2017 | White |
| 2017/0364950 | A1 | 12/2017 | Elvekrog et al. |

OTHER PUBLICATIONS

"Facebook", www.facebook.com; Jun. 28, 2011.
"Google AdSense", www.google.com/adsense; Jun. 28, 2011.
"Myspace", www.myspace.com; Jun. 28, 2011.
"Priceline.com", www.priceline.com; Jun. 28, 2011.
Spring, Martin et al., "Service, services and products: rethinking

(56) References Cited

OTHER PUBLICATIONS operations strategy", Lancaster University Management School, Lancaster, UK, International Journal of Operations and Production Management, vol. 29, No. 5,, 2009, pp. 444-467.

* cited by examiner

400

1000

SYSTEM AND METHOD FOR PROMOTING MARKETABLE ITEMS

CROSS-REFERENCE TO RELATED APPLICATION

This application is a continuation of U.S. patent application Ser. No. 14/679,063, filed Apr. 6, 2015, which is a continuation of U.S. patent application Ser. No. 14/529,379, filed Oct. 31, 2014, which is a continuation of U.S. patent application Ser. No. 14/260,336, filed Apr. 24, 2014 (now U.S. Pat. No. 8,904,448), which is a continuation of U.S. patent application Ser. No. 12/037,756, filed Feb. 26, 2008 (now U.S. Pat. No. 8,745,670), which are incorporated herein by reference in their entireties.

FIELD OF THE DISCLOSURE

The present disclosure relates generally to marketing techniques and more specifically to a system and method for promoting marketable items.

BACKGROUND

Some merchants promote consumer products on broadcast television by way of advertisements interleaved in time with popular television programs. Merchants have also promoted their products by making arrangements for actors and actresses to use their products during the television program and/or by positioning the products in a noticeable background setting.

DETAILED DESCRIPTION

One embodiment of the present disclosure entails a media processor having a controller to receive from a media communication system metadata describing one or more marketable items depicted in a media program supplied by the media communication system, present images of the media program at a media presentation device without highlighting the one or more marketable items, present an icon at least at one of a remote controller managing operations of the media processor or the media presentation device to indicate a presence of the one or more marketable items in one or more of the images presented at the media presentation device, detect a selection of the icon, and highlight the one or more marketable items.

Another embodiment of the present disclosure entails a computer-readable storage medium having computer instructions for receiving a media program supplied with metadata to selectively enable viewing of one or more marketable items depicted in the same media program.

Yet another embodiment of the present disclosure entails a method involving collecting metadata to describe one or more marketable items depicted in a media program supplied by a media communication system, and supplying the metadata to a media processor to selectively enable viewing of the one or more marketable items in the media program.

Another embodiment of the present disclosure entails a method involving promoting one or more marketable items in a media program supplied to a media processor with metadata, wherein the metadata is utilized by the media processor to selectively enable viewing of the one or more marketable items in the media program.

Figure 1:
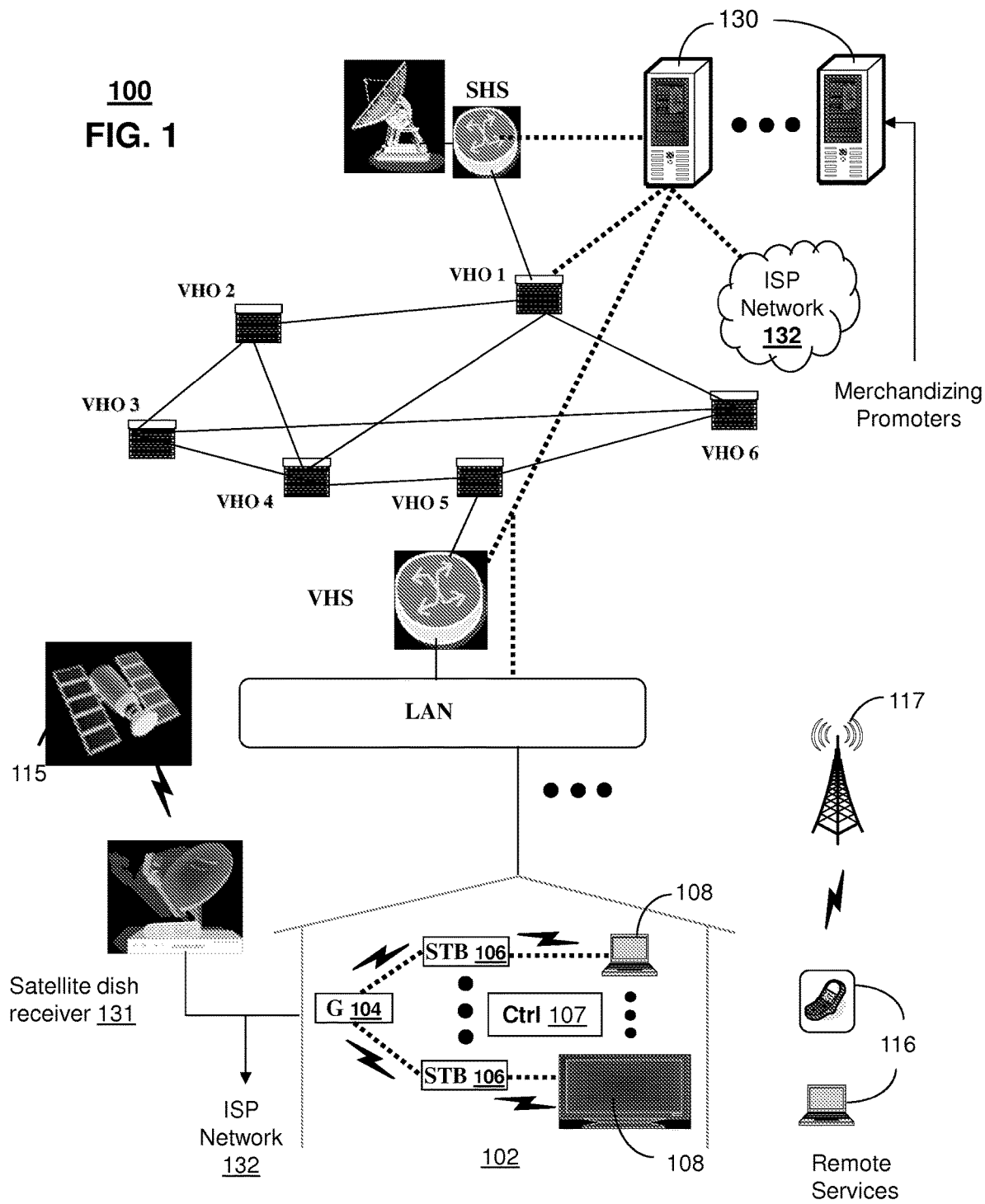
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). Another distinct portion of the one or more computing devices 130 can be used as a marketing system 130 for constructing and distributing metadata associated with marketable items presented in media programs broadcasted by the media communication system 100.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
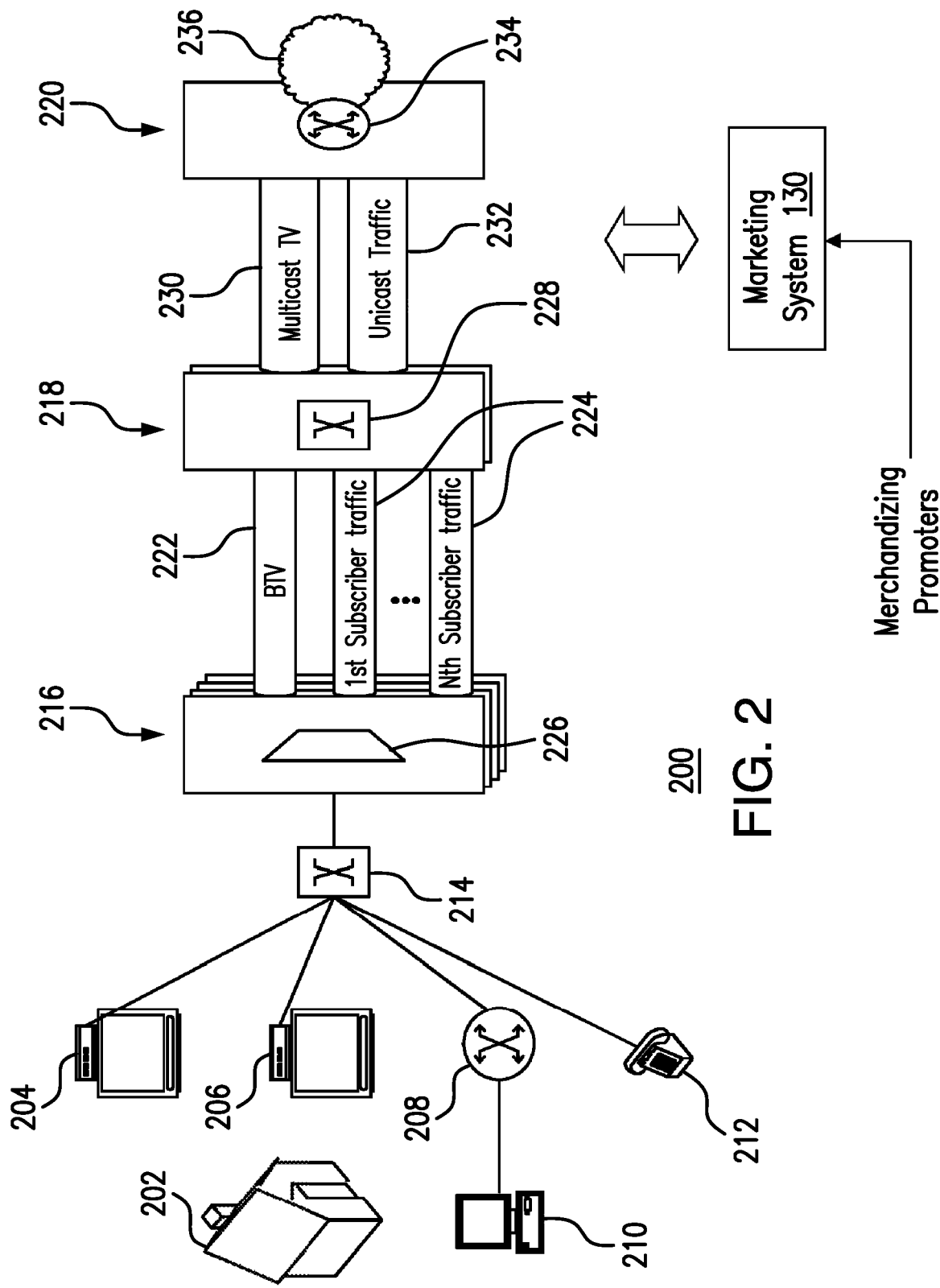

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The marketing system 130 of FIG. 1 can be operably coupled to the second communication system 200 for constructing and distributing metadata associated with marketable items.

Figure 3:
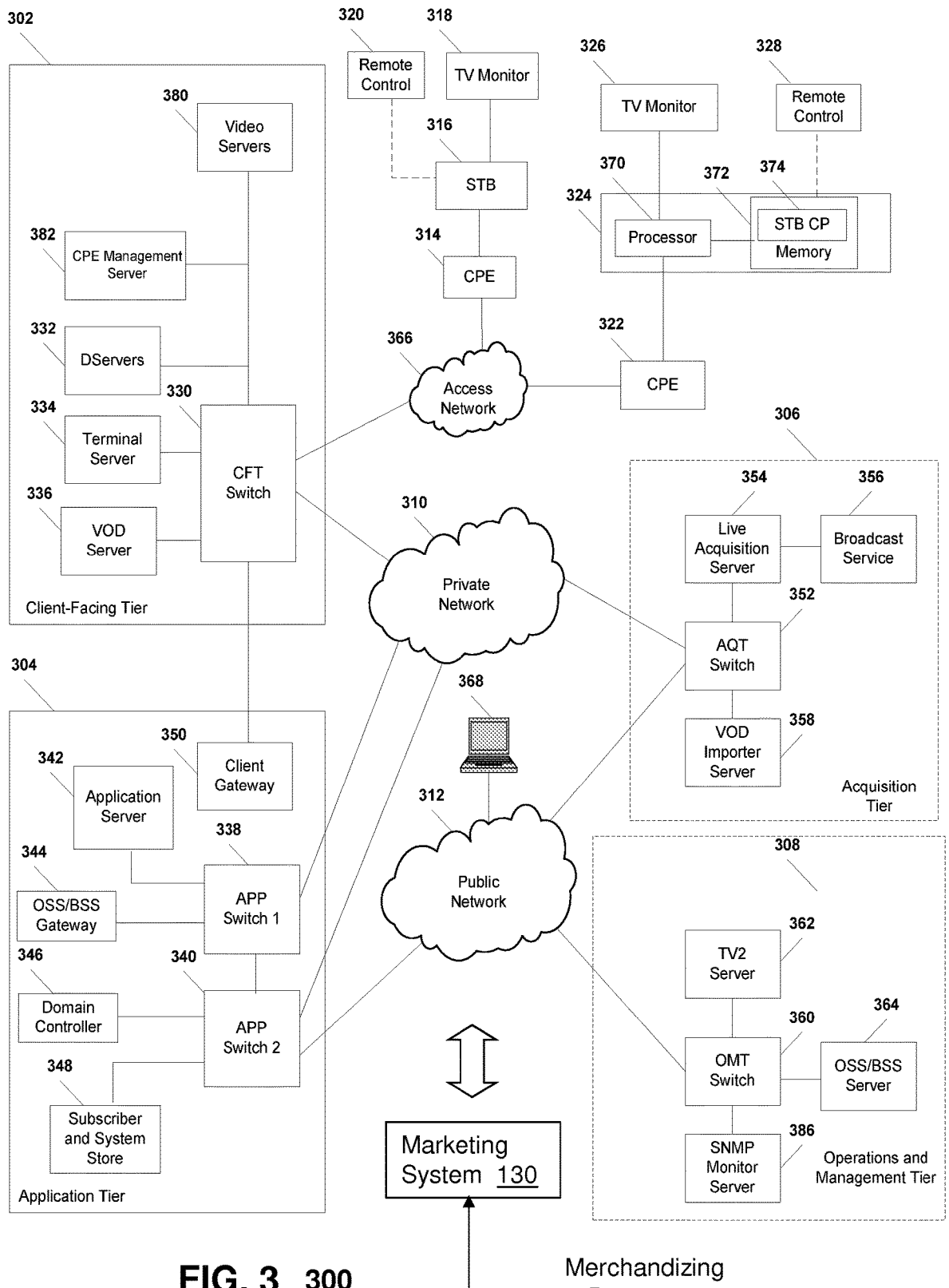

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The marketing system 130 of FIGS. 1-2 can be operably coupled to the third communication system 300 for constructing and distributing metadata associated with marketable items.

It should be apparent to one of ordinary skill in the art from the foregoing media communication system embodiments that other suitable media communication systems for distributing broadcast media content as well as peer-to-peer exchange of content can be applied to the present disclosure.

Figure 4:
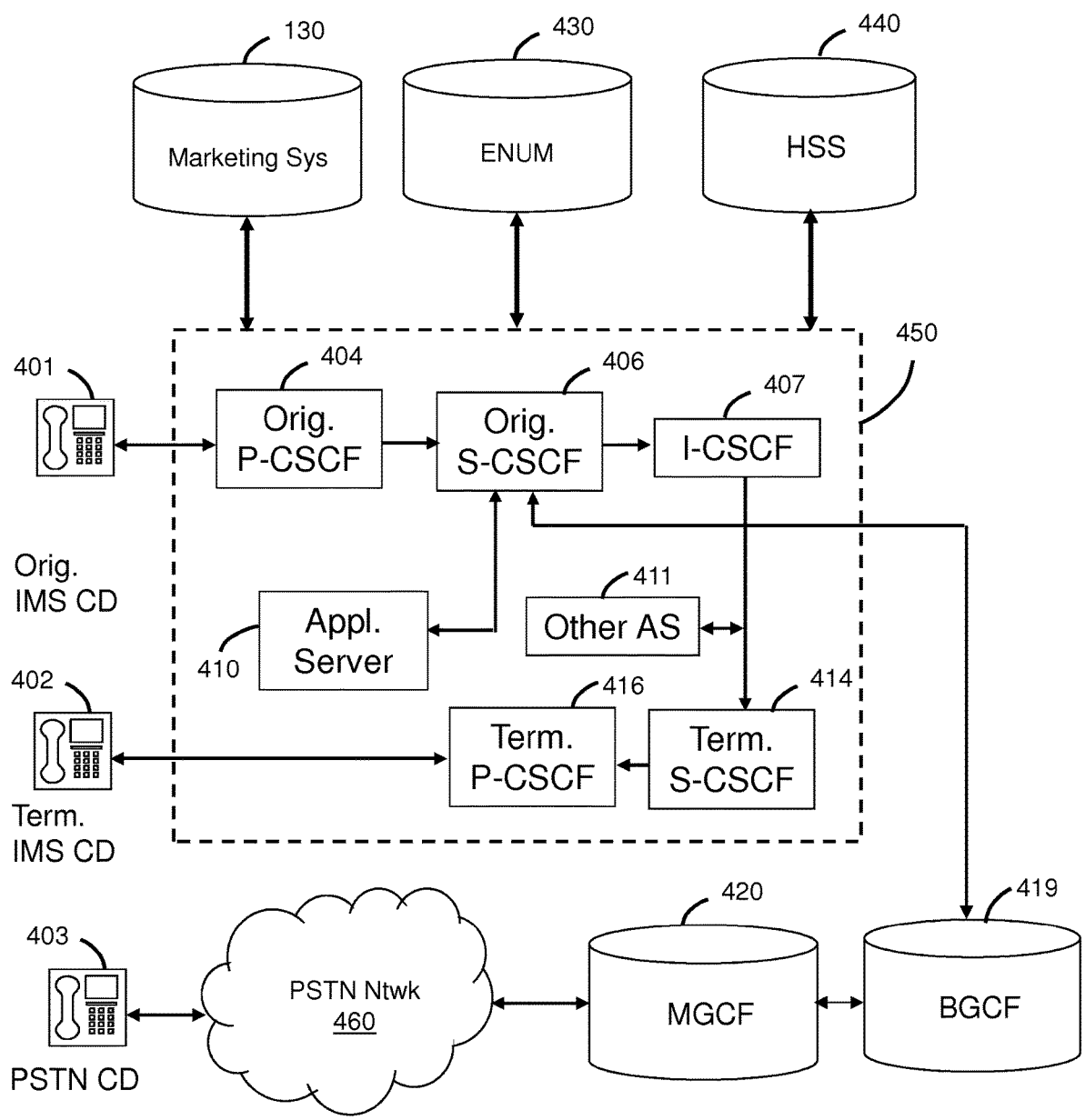

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the marketing system 130 previously discussed for FIG. 1. In this representative embodiment, the marketing system 130 can be accessed over a PSTN or VoIP channel of communication system 400 by common techniques such as described above.

Figure 5:
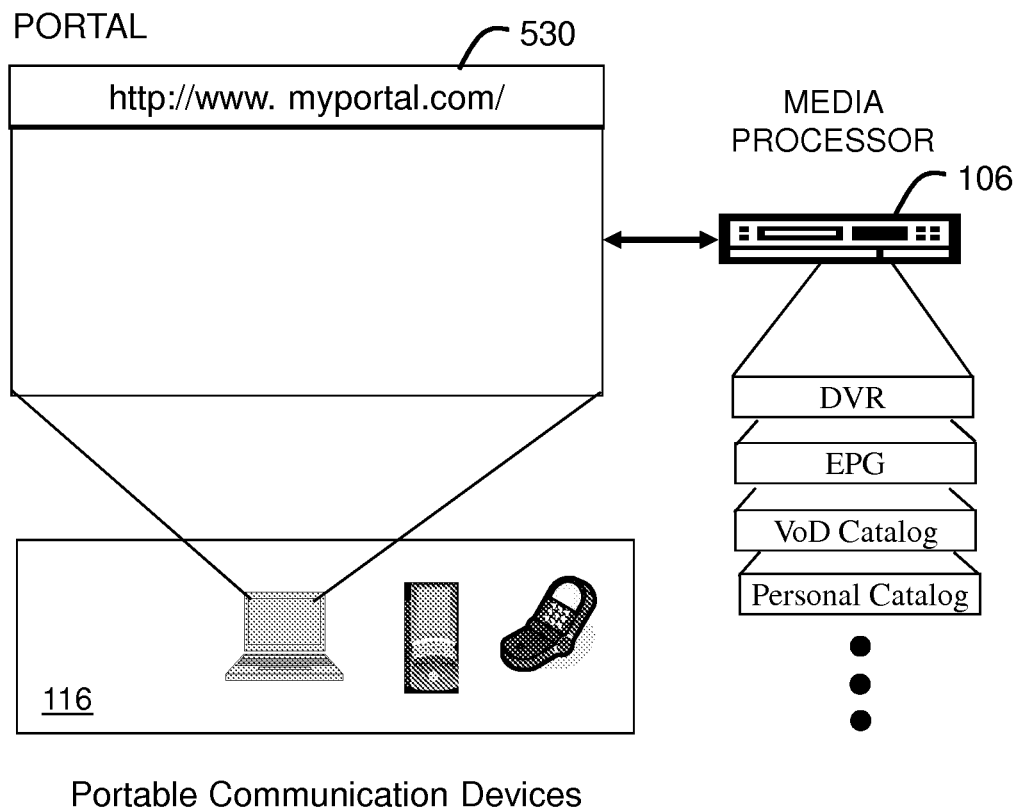
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
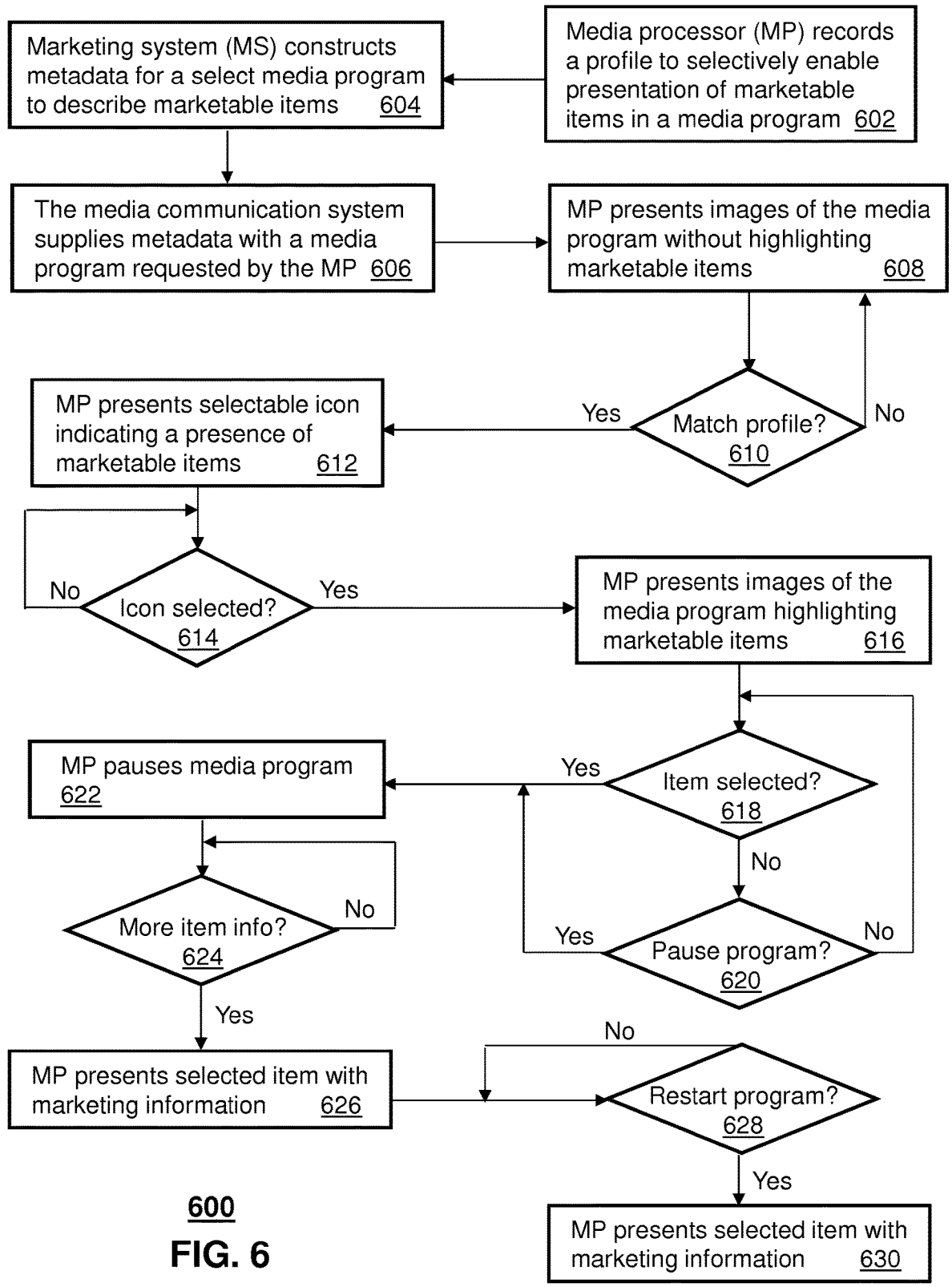
FIG. 6 depicts an exemplary method operating in portions of the communication systems of FIGS. 1-4.

FIG. 6 depicts an exemplary method 600 operating in portions of communication systems 100-400. FIGS. 7-13 depict graphical user interfaces (GUIs) associated with the steps of method 600. Method 600 can begin with step 602 in which a media processor such as an STB of FIGS. 1-3 records a profile to selectively enable presentation of marketable items in the media programs supplied by any of the media communication systems described earlier. The profile can be supplied by portal 530 as directed by a subscriber of the media communication system.

The portal 530 can for example present the subscriber a graphical user interface for entering user preferences for enabling presentation of marketable items embedded in media programs. The subscriber can define in a profile one or more preferred marketable items, one or more preferred media programs, one or more preferred media channels, one or more preferred media genres (e.g., action, comedy, drama, etc.), one or more preferred media program performers (e.g., actors, actresses, singers, etc.), one or more preferred producers of media programs, one or more preferred directors of media programs, or combinations thereof. Other suitable preferences can be defined by the subscriber.

Suppose for instance that the subscriber has an attraction to the media program "Friends." The subscriber can identify this program and all its episodes as a media program in which presentation of marketable items can be enabled. The subscriber can if desired designate this as the only media program to view marketable items. Other media programs with marketable items can thus be ignored by the media processor. In another illustrative embodiment, the subscriber can hierarchically define preferences such as for example by choosing a genre preference for media programs relating to comedy presented in a preferred media channel. In yet another illustrative embodiment, the subscriber can identify preferred performers (e.g., actors/actresses) which when identified in any media program of any media channel, the media processor can selectively enable presentation of marketable items in the media program in which the preferred performer is found. In sum, the profile supplied by the subscriber can be constructed to selectively enable presentation of marketable items based on any bias identified by the subscriber.

In step 604 the marketing system 130 can be directed to construct metadata for a select media program to describe marketable items embedded therein. In order to construct the metadata, the marketing system 130 can receive from promoters descriptions of the marketable items promoted thereby in the media program. The description can include coordinates for locating and outlining marketable items in a media program using image mapping techniques. The description can also include marketing information such as product logos, promotions, hyperlinks to websites, pricing information, a description of the marketable item, and/or other suitable marketing information, which can be utilized collectively by the media processor to present the marketable item to a user of the media processor when selected.

Figure 7:
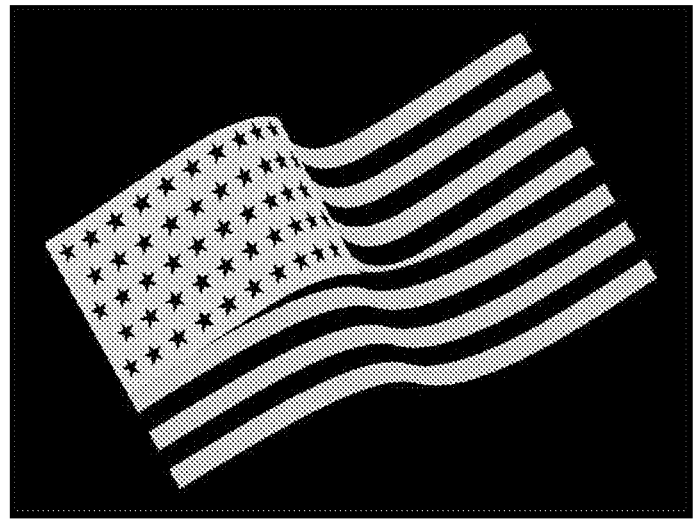
FIGS. 7-15 depict exemplary images illustrating in part the method of FIG. 6.
Figure 8:
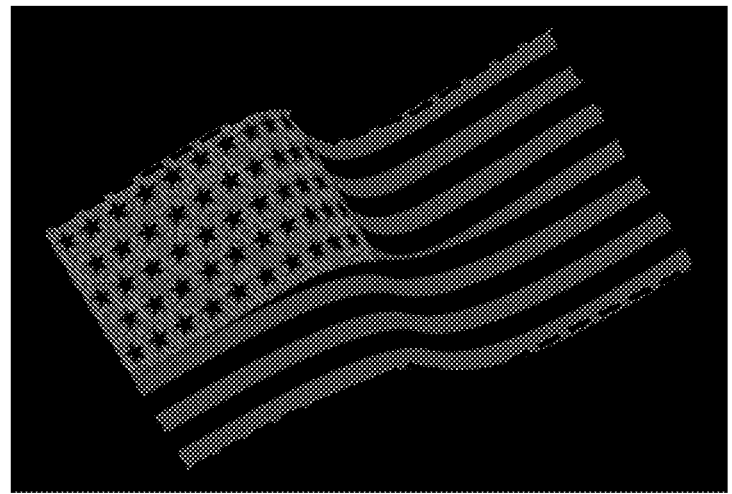

FIGS. 7-8 illustrate an exemplary image mapping technique. In this illustration the flag in FIG. 7 is shown unaltered, while the flag in FIG. 8 is faded with an image boundary which can be contrasted against other images in a media program. The coordinate(s) in the metadata can provide a media processor the means to locate the marketable item and with the use of common image mapping software applications outline the item while the media program is being presented, or when the media program is paused.

Steps 602 and 604 as described can operate as background or provisioning steps which can operate independently or contemporaneously with the run time steps 606-630.

With this in mind, in step 606 the media communication system supplies the metadata created by the marketing system 130 for a select media program requested by the media processor. This step can represent a subscriber of the media processor selecting a media channel, or a media program from a VoD catalog. Responsive to receiving the media program accompanied or embedded with metadata, the media processor can present in step 608 images of the media program at a media presentation device such as reference 108 of FIG. 1 without highlighting the marketable items. In step 610, the media processor can determine if metadata describing the media program complies with the preferences of the profile. If the media program does not match the profile, the media processor returns to step 608, and the media program presentation continues unaltered. If however a match is detected in step 610, the media processor proceeds to step 612 where it presents a selectable icon superimposed on the images of the media program indicating a presence of marketable items.

Figure 9:
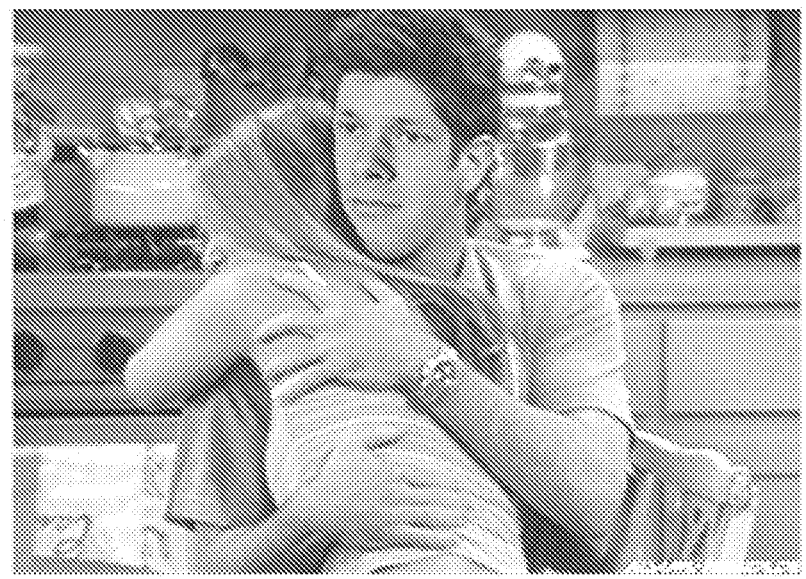
Figure 10:

FIGS. 9-10 are illustrative of these steps. FIG. 9 illustrates the media program without an icon when the media processor detects that the program does not comply with the profile preferences. FIG. 10 instead presents the icon 1002 on the bottom right to indicate to the viewer that marketable items are present for a media program that matches the preferences established by the subscriber in the profile. In another illustrative embodiment, the icon can be presented at a remote controller such as reference 107 of FIG. 1 to avoid interrupting the presentation of the media program at the media presentation device 108. In yet another illustrative embodiment, the icon can be presented at both the media presentation device 108, and the remote controller 107. In FIG. 10 the icon 1002 is shown illustratively as an exclamation symbol. Other suitable iconic symbols can be utilized to inform viewers that marketable items are present in the media program.

In step 614 the media processor can monitor a selection of the icon by the viewer. The icon can be selected by common means. For example the remote controller 107 of FIG. 1 can be equipped with a navigation mechanism such as a roller ball, disk, or other navigation element to navigate a selector 1004 similar to a mouse pointer on the screen of the media presentation device or remote controller. Once the pointer is positioned at or near the icon, the icon can be selected with a selection key of the remote controller (such as an OK or select button) to indicate a desire to begin presentation of the marketable items. In another illustrative embodiment, the icon can be a hard key or softkey of the remote controller 107, which can be selected without navigation.

Figure 11:
Figure 12:
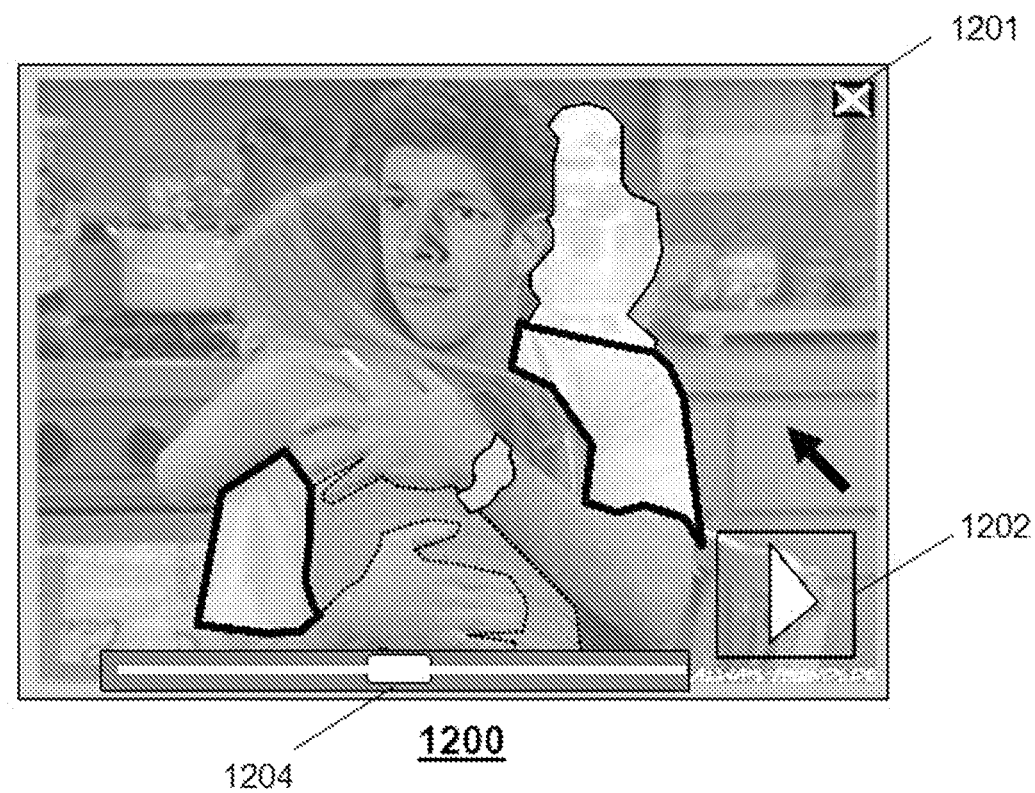
Figure 13:
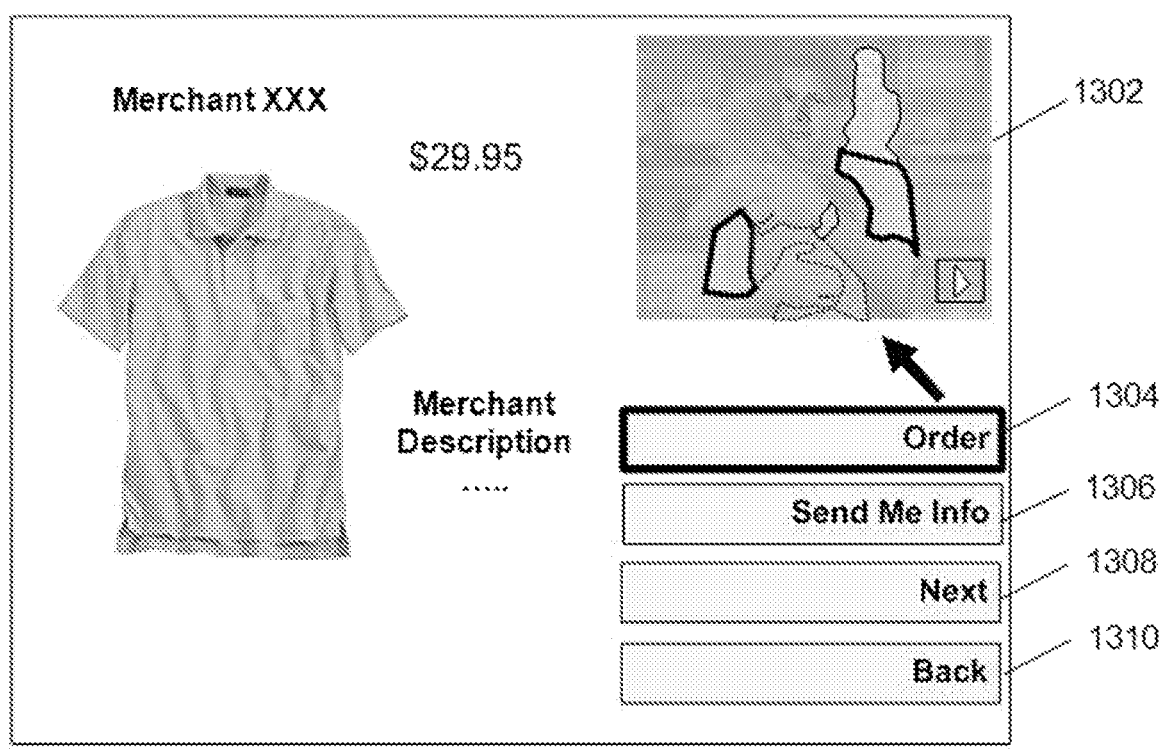

Once a selection of the icon is detected in step 614, the media processor can be directed to step 616 where it highlights the presentation of the marketable items as illustratively shown in FIGS. 11-12. In one illustrative embodiment, the marketable items 1104-1110 can be highlighted with image outlines at the media presentation device with a selectable pause button 1102 to stop programming when one or more items of interest are found by the subscriber. In another illustrative embodiment, pausing can occur by selecting any of the highlighted marketable items with the selector 1004 while the media program is being viewed. In yet another illustrative embodiment, the highlighting process can take place instead at a remote controller with a display (such as an LCD color display) to avoid interrupting the presentation of the media program at the TV set 108.

Once an item selection is detected in step 618 or the pause button 1102 is selected in step 620, the media processor can proceed to step 622 where it pauses the media program with the highlighted marketable items and begins recording the media program from the departure point to accommodate subsequent playback of the program. This step is illustrated in FIG. 12. At step 622, the media processor can present a play button 1202 in place of the previous pause button 1102 as shown in FIG. 12. The media processor can also present a scroll bar 1204 which provides a means to scroll back and forth between frames of the media program to assist the viewer in finding and viewing the marketable item of interest from several perspectives. The scroll bar 1204 can also be useful when the subscriber is unable to pause the media program at a point that shows the marketable items of interest.

Once the subscriber finds the marketable items of interest, the subscriber can select one or more of these items and invoke a request in step 624 for additional information. The subscriber can select more than one marketable item by navigating pointer 1004 to each item, selecting it with the selector button of the remote controller and then selecting for example an "Info" button on the remote controller to request additional information about the items selected. In another illustrative embodiment, another icon can be added to FIG. 12 (not shown) to selectively invoke a request for additional information on the selected marketable items rather than rely on a hard key such as the "info" button.

Once a request is detected in step 624, the media processor can proceed to step 626 where it presents the selected item (or items) with marketing information. This step is illustratively shown in FIG. 13. In this step, the media processor can present an additional GUI which occupies the full screen of the media presentation device (or display of the remote controller) or is superimposed on the GUI of the media program (much like a picture-in-picture technique). The GUI of FIG. 13 can identify the merchant selling the marketable item with a detailed picture of the marketable item, a detailed description of the item, pricing information, a window 1302 showing the media program with the marketable items selected in step 624, and a number of selectable GUI buttons 1304-1310. With buttons 1304-1310, the viewer can order the merchandise, request more information to be sent to the viewer (e.g., by email or other communication means), skip to the next marketable item selected, or return to the original screen.

In step 628, the media processor can determine if an event has occurred to restart the media program. A restart event can occur responsive to the selection of the playback button 1202 in FIG. 12 or 13. A restart event can also occur when the viewer cancels a GUI by selecting a GUI cancellation symbol 1201 such as shown in FIG. 12. Once a restart event is detected, the media processor can be directed to step 630 where it continues presentation of the media program from the departure point. The media program can be restarted without the marketable items highlighted as shown in FIG. 10, but with the icon 1002 in the event the viewer wants to re-invoke the request to highlight items embedded in the media program as described in steps 606-630.

Figure 14:
Figure 15:

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that marketable items can be viewed first and then cross referenced to previously presented media programs. This embodiment is illustrated in FIGS. 14-15. In this illustrative embodiment, a viewer can request a presentation of marketable items for a select media program, media channel, genre, or other preference by way of a menu selection supplied by the remote controller or portal 530. The marketable items can be presented in a vertical scrollable bar. When one or more marketable items are selected, the marketable items can be highlighted in one or more frames which can be viewed sequentially. The GUI presented by the media processor or portal 530 can also provide media presentation controls such as play, fast forward, fast rewind, pause, or a frame scroll bar to provide the viewer a means to adjust the presentation as desired.

Other suitable modifications that can be applied to the present disclosure without departing from the scope of the claims below. Accordingly, the reader is directed to the claims section for a fuller understanding of the breadth and scope of the present disclosure.

Figure 16:
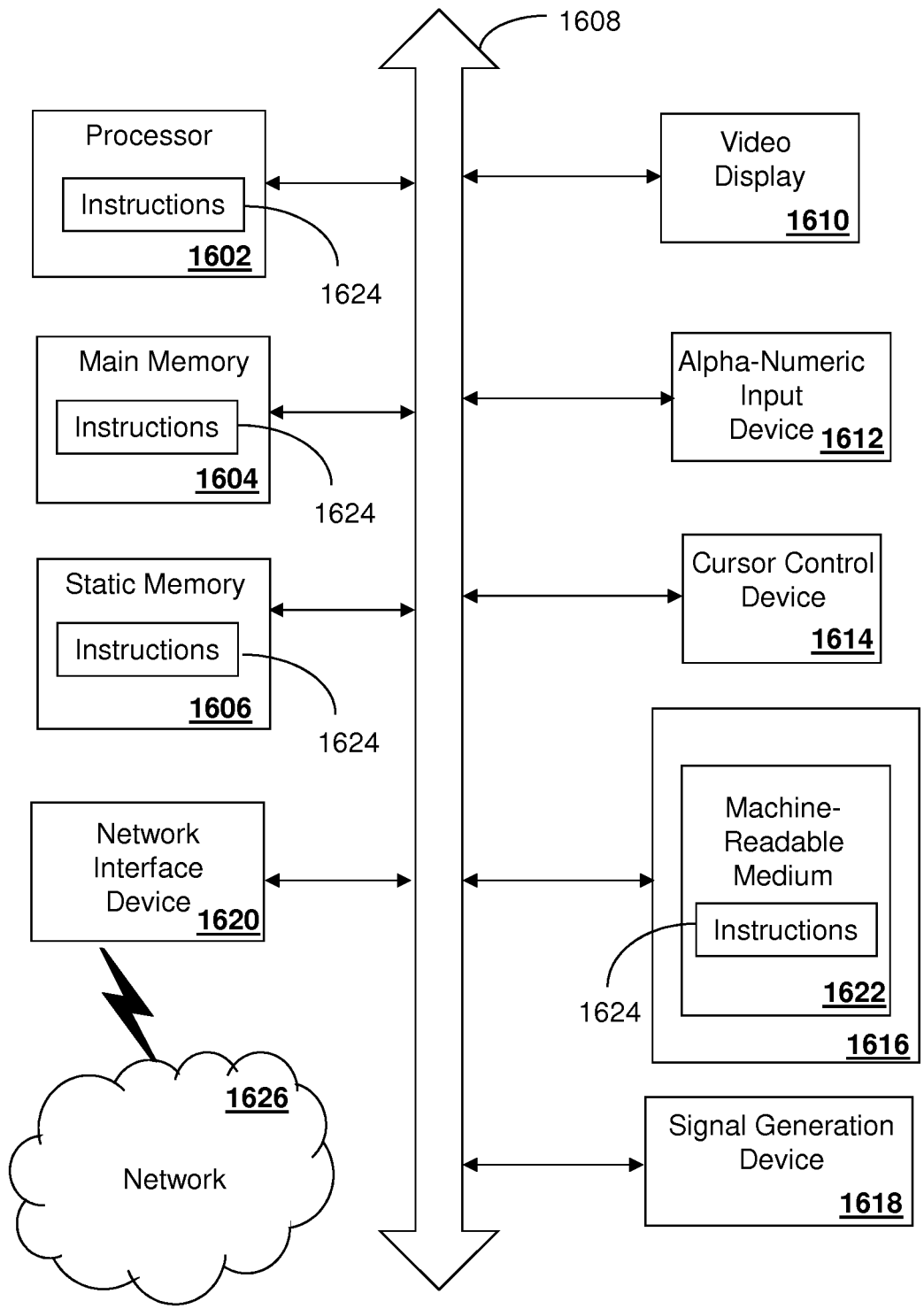
FIG. 16 is a diagrammatic representation of a machine in the form of a computer system within which a set of instructions, when executed, may cause the machine to perform any one or more of the methodologies discussed herein.

FIG. 16 depicts an exemplary diagrammatic representation of a machine in the form of a computer system 1600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1600 may include a processor 1602 (e.g., a central processing unit (CPU), a graphics processing unit (GPU, or both), a main memory 1604 and a static memory 1606, which communicate with each other via a bus 1608. The computer system 1600 may further include a video display unit 1610 (e.g., a liquid crystal display (LCD), a flat panel, a solid state display, or a cathode ray tube (CRT)). The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a machine-readable medium 1622 on which is stored one or more sets of instructions (e.g., software 1624) embodying any one or more of the methodologies or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1624, or that which receives and executes instructions 1624 from a propagated signal so that a device connected to a network environment 1626 can send or receive voice, video or data, and to communicate over the network 1626 using the instructions 1624. The instructions 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
a memory that stores instructions; and
a processing system including a processor coupled to the memory, wherein responsive to executing the instructions, the processing system performs operations, the operations comprising:
generating a user-defined preference for a program, wherein the program includes a plurality of episodes, and wherein the user-defined preference excludes all other content such that the plurality of episodes of the program are an only content included in the user-defined preference;
identifying a presentation of one of the plurality of episodes of the program at a media device according to the user-defined preference;
presenting, at a remote controller that includes a portable phone, during the presentation of the one of the plurality of episodes of the program at the media device, a first image of a marketable item;
presenting at the media device and the remote controller an icon that indicates that the marketable item is included in the presentation of the one of the plurality of episodes of the program;
presenting at the media device a vertical scrollable bar, wherein the vertical scrollable bar includes a plurality of marketable items, and wherein the plurality of marketable items includes the marketable item;
pausing the presentation of the one of the plurality of episodes of the program at the media device in response to a selection of the icon presented at the media device, the icon presented at the remote controller, or a combination thereof; and
pausing the presentation of the one of the plurality of episodes of the program at the media device in response to a selection of the marketable item from the vertical scrollable bar, wherein the selection of the marketable item from the vertical scrollable bar causes an adjustment to the presentation of the one of the plurality of episodes of the program at the media device such that the marketable item is highlighted in a plurality of frames that can be viewed sequentially.

2. The device of claim 1, wherein the operations comprise constructing metadata for the program, wherein the metadata include a description of the marketable item.

3. The device of claim 2, wherein the description includes coordinates for locating the marketable item using image mapping techniques.

4. The device of claim 2, wherein the description includes at least one of a product logo, a promotion, a hyperlink to a website associated with the marketable item, and pricing information.

5. The device of claim 4, wherein the operations comprise presenting the website in response to a selection at the remote controller of the first image of the marketable item.

6. The device of claim 1, wherein the operations comprise receiving a request for additional information for the marketable item from the remote controller.

7. The device of claim 6, wherein the operations comprise:
presenting the program on the media device in a first window; and
presenting the additional information for the marketable item on the media device in a second window.

8. The device of claim 7, wherein the operations comprise superimposing the second window onto the first window using a picture-in-picture technique.

9. A method comprising:
generating, by a processing system including a processor, a user-defined preference for a program, wherein the program includes a plurality of episodes, and wherein the user-defined preference excludes all other content such that the plurality of episodes of the program are an only content included in the user-defined preference;
identifying, by the processing system, a presentation of one of the plurality of episodes of the program according to the user-defined preference, wherein the presentation of the one of the plurality of episodes of the program is on a media device in a first window;

presenting, by the processing system, during the presentation of the one of the plurality of episodes of the program at the media device, a first image of a marketable item;

causing, by the processing system, a presentation of a vertical scrollable bar at the media device, wherein the vertical scrollable bar includes a plurality of marketable items, and wherein the plurality of marketable items includes the marketable item;

pausing, by the processing system, the presentation of the one of the plurality of episodes of the program in response to a selection of the first image of the marketable item;

causing, by the processing system, the presentation of the one of the plurality of episodes of the program to be paused at the media device in response to a selection of the marketable item from the vertical scrollable bar, wherein the selection of the marketable item from the vertical scrollable bar causes an adjustment to the presentation of the one of the plurality of episodes of the program at the media device such that the marketable item is highlighted in a plurality of frames that can be viewed sequentially;

recording, by the processing system, the one of the plurality of episodes of the program starting at a point coinciding with the selection of the first image of the marketable item to accommodate subsequent playback of the one of the plurality of episodes of the program;

presenting, by the processing system, a playback button and a cancellation symbol in response to the selection of the first image of the marketable item, wherein the cancellation symbol is different from the playback button;

receiving, by the processing system, a request for additional information for the marketable item from a remote controller;

presenting, by the processing system, the additional information for the marketable item on the media device in a second window;

determining, by the processing system, that an event has occurred subsequent to the pausing to restart a playback of the one of the plurality of episodes of the program, wherein the event comprises a selection of the playback button or a selection of the cancellation symbol; and responsive to determining that the event has occurred, restarting, by the processing system, the playback of the one of the plurality of episodes of the program at the point coinciding with the selection of the first image of the marketable item based on the recording.

10. The method of claim 9, wherein presenting the first image of the marketable item comprises presenting the first image of the marketable item at the remote controller.

11. The method of claim 10, comprising superimposing, by the processing system, the second window onto the first window using a picture-in-picture technique.

12. The method of claim 9, wherein the marketable item is associated with metadata for the program, and wherein the metadata includes a description of the marketable item.

13. The method of claim 12, wherein the description includes coordinates for locating the marketable item using image mapping techniques.

14. The method of claim 12, wherein the description includes a hyperlink to a website associated with the marketable item, and wherein the method comprises presenting, by the processing system, the website in response to the selection of the first image of the marketable item.

15. A non-transitory machine-readable storage medium comprising instructions which, responsive to being executed by a processing system including a processor, cause the processing system to perform operations, the operations comprising:

generating a user-defined preference for a program, wherein the program includes a plurality of episodes, and wherein the user-defined preference excludes all other content such that the plurality of episodes of the program are an only content included in the user-defined preference;

identifying a selection of one of the plurality of episodes of the program according to the user-defined preference;

presenting, during a presentation of the one of the plurality of episodes of the program at a media device, a first image of a marketable item;

causing a presentation of a vertical scrollable bar at the media device, wherein the vertical scrollable bar includes a plurality of marketable items, and wherein the plurality of marketable items includes the marketable item;

pausing the presentation of the one of the plurality of episodes of the program in response to a selection of the first image of the marketable item;

causing the presentation of the one of the plurality of episodes of the program to be paused at the media device in response to a selection of the marketable item from the vertical scrollable bar, wherein the selection of the marketable item from the vertical scrollable bar causes an adjustment to the presentation of the one of the plurality of episodes of the program at the media device such that the marketable item is highlighted in a plurality of frames that can be viewed sequentially;

presenting a playback button and a cancellation symbol in response to the selection of the first image of the marketable item, wherein the cancellation symbol is different from the playback button;

adjusting the presentation of the one of the plurality of episodes of the program according to a user-generated input to view the marketable item from a plurality of perspectives;

determining that an event has occurred subsequent to the pausing to restart a playback of the one of the plurality of episodes of the program, wherein the event comprises a selection of the playback button or a selection of the cancellation symbol; and responsive to determining that the event has occurred, restarting the playback of the one of the plurality of episodes of the program at a point coinciding with the selection of the first image of the marketable item based on a recording.

16. The non-transitory machine-readable storage medium of claim 15, wherein the presenting of the first image of the marketable item is on a remote controller.

17. The non-transitory machine-readable storage medium of claim 15, wherein the presenting of the first image of the marketable item is on the media device.

18. The non-transitory machine-readable storage medium of claim 15, wherein the operations comprise presenting, by the processing system, the one of the plurality of episodes of the program on the media device in a first window.

19. The non-transitory machine-readable storage medium of claim 18, wherein the operations comprise:

presenting a second image of the marketable item; and displaying, by the processing system, additional information for the marketable item on the media device in a second window in response to receiving a user-selection of the second image of the marketable item.

20. The non-transitory machine-readable storage medium of claim 19, wherein the operations comprise superimposing the second window onto the first window using a picture-in-picture technique.

* * * * *